United States Patent
Umemura

[15] 3,648,581
[45] Mar. 14, 1972

[54] STRUCTURE FOR ADJUSTING A CAMERA AND CHECKING A BATTERY THEREOF

[72] Inventor: Yukio Umemura, Tokyo, Japan
[73] Assignee: Asahi Koyaku Kogyo Kabushiki Kaisha, Tokyo-to, Japan
[22] Filed: Jan. 28, 1971
[21] Appl. No.: 110,533

[30] Foreign Application Priority Data
Feb. 5, 1970    Japan..................................45/11240

[52] U.S. Cl..............................95/11 R, 95/10 C, 324/29.5
[51] Int. Cl........................................................G03b 17/18
[58] Field of Search...................95/11, 10 C, 10 CE, 10 CT, 95/10 CD; 352/170, 171; 324/29.5

[56] References Cited

FOREIGN PATENTS OR APPLICATIONS 1,243,380   12/1959   France..................................95/10 C
1,060,080   2/1967   Great Britain........................352/170

Primary Examiner—John M. Horan
Assistant Examiner—Robert P. Greiner
Attorney—Steinberg & Blake

[57] ABSTRACT

A camera having adjustable structure for determining exposure of film in the camera as well as a battery-checking structure. The adjustable structure can be selectively set with a setting structure while the battery-checking structure includes a normally open switch. Upon closing the latter switch a battery-checking circuit will be closed. The structure for setting the exposure determining structure of the camera can be moved to a position for closing the normally open battery-checking switch. When the setting structure is released it is automatically displaced to a position where the camera structure is adjusted for automatically determining the exposure and the normally open switch is in its open position.

10 Claims, 3 Drawing Figures

Patented March 14, 1972
3,648,581
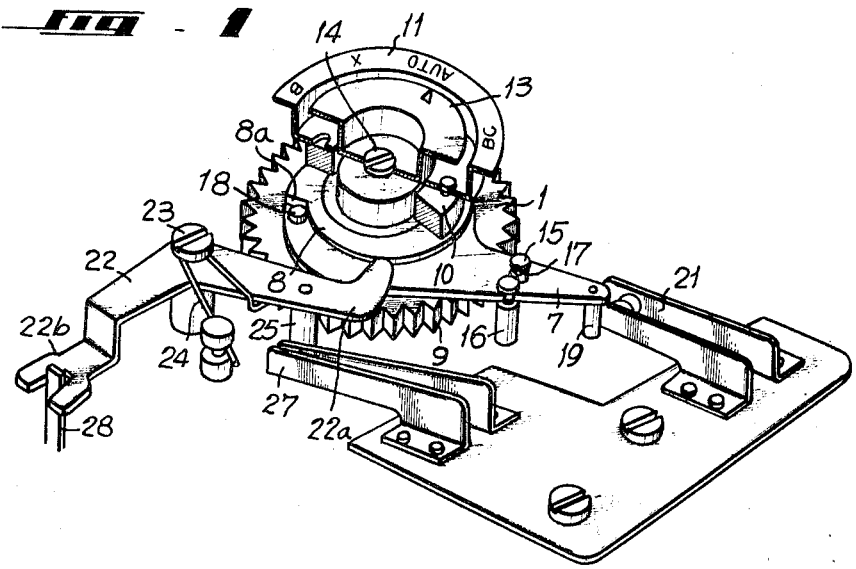
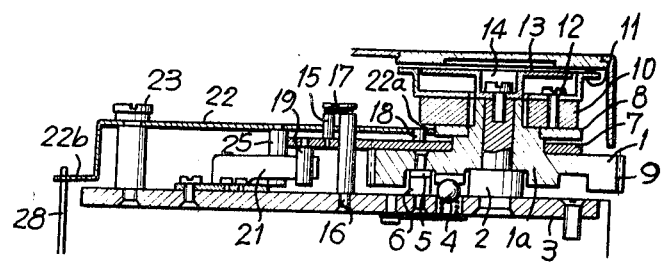
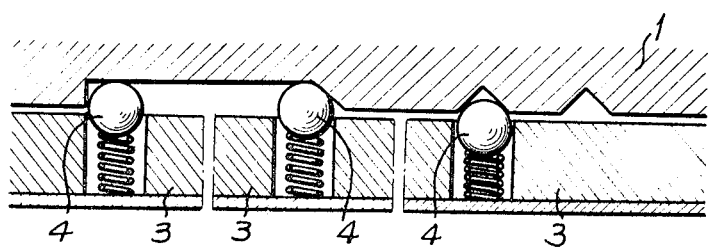
INVENTOR
YUKIO UMEMURA
BY
Steinberg and Blake
ATTORNEYS

STRUCTURE FOR ADJUSTING A CAMERA AND CHECKING A BATTERY THEREOF

BACKGROUND OF THE INVENTION

The present invention relates to cameras.

More particularly, the present invention relates to cameras which can be adjusted so as to provide for automatic exposure determination, for example.

The invention relates in particular to that type of camera where not only can adjustments be made for automatic exposure determination but where in addition it is possible to check the condition of a battery in the camera.

Cameras of this general type are already known. Thus, where a camera is provided with an automatic exposure-determining circuit which is powered from a battery, it is also possible with a conventional camera of this type to check the condition of the battery through a special circuit provided for this purpose. Thus, with conventional structures there is on the one hand shutter-setting structure for automatically determining the exposure of film in the camera, assuming that the photographing conditions are such as to permit automatic exposure to take place, and in addition there is a structure for checking the condition of the battery which is used for the circuit of the automatic exposure-determining structure. With these cameras it is required to change between the circuit of the automatic exposure determining structure and the battery-checking circuit. Conventionally, the camera has at its exterior a changeover switch. The latter switch is usually referred to as a check switch and must be manually operated in order to bring about the checking of the battery, and of course the switch must be returned to its initial position in order to provide for automatic exposure determination.

As a result, the conventional arrangement is inconvenient and complicated, and in addition creates a great possibility of erroneous operation of the camera. For example, it is possible easily to forget to return the battery-checking switch to the position required for automatic exposure determination, so that under these conditions it is possible to actuate the shutter while the electrical circuit for battery checking is rendered operative, with of course improper camera-operation being the unavoidable result. Thus, it is essential with conventional structures that the operator remember to return the camera to its position for proper operation after the condition of the battery is checked. It is also essential to provide the shutter-actuating structure with a given position in order to carry out proper battery-checking operations, so that with conventional cameras in order to provide for accurate checking of the battery it is necessary to set the shutter-adjusting structure in a predetermined position and set a switch in a proper position, while in order to return to normal camera operation it is necessary to again set the shutter-actuating structure in a given position and to remember to turn off the switch which was turned on in connection with battery-checking operations.

SUMMARY OF THE INVENTION

It is accordingly a primary object of the present invention to provide a camera with the structure which will avoid all of the above complications.

In particular, it is an object of the invention to provide a camera with a structure which will not require the operator to remember special camera settings, so that the possibility of erroneous operation is avoided.

In particular, it is an object of the present invention to provide a construction which will eliminate the necessity for a multiplicity of operations of the type referred to above in order to effect both exposure and battery checking.

Furthermore, it is an object of the present invention to provide an exceedingly simple and compact structure which incorporates all that is required for battery checking into the shutter-setting structure itself, thus greatly simplifying the operations and reducing the space occupied by the structure.

According to the invention a normally open battery-checking switch forms part of a battery-checking circuit. A switch-actuating means is provided for closing this switch. An adjustable shutter-actuating means is provided for setting the shutter of the camera. A setting means is provided for setting the adjustable shutter-actuating means at a selective position one of which is an automatic position for automatically determining the exposure of film in the camera. This setting means also has a battery-checking position, and when moved to the latter position the setting means coacts with the switch-actuating means for closing the normally open battery-checking switch. Therefore, whenever the setting means is placed in its battery-checking position the circuit for checking the battery will be automatically closed. According to the invention an automatic means coacts with the setting means for automatically placing the latter in its position for automatically determining exposure when the setting means is not maintained in its position for checking the condition of a battery.

BRIEF DESCRIPTION OF DRAWINGS

The invention is illustrated by way of example in the accompanying drawings which form part of this application and in which:

FIG. 1 is a partly schematic perspective illustration of a structure according to the invention;

FIG. 2 is a schematic longitudinal sectional elevation showing further details of the structure of FIG. 1; and FIG. 3 is an enlarged sectional schematic representation of a click-stop mechanism forming part of the structure of FIGS. 1 and 2.

DESCRIPTION OF PREFERRED EMBODIMENTS

Referring to the drawing, the structure illustrated therein includes a setting means for setting an adjustable shutter of the camera. This setting means 1 is in the form of a rotary member adapted to be manually turned to a selected position. The rotary setting means 1 is adapted to set the shutter for providing a predetermined type of exposure. The setting means 1 is shown in FIG. 1 in the position AUTO, this being the position for automatically determining the exposure. The illustrated structure includes a power-source switch 27. This switch is a normally open switch. It is connected into a suitable circuit in series with a second switch. This latter, second switch is adapted to be closed during the initial part of movement of a shutter-tripping plunger, button, or the like, which is not illustrated, so that both of these switches must be closed in order to provide for automatic exposure determination. The power-source switch 27 is shown in FIG. 1 in its closed position, so that when the setting means 1 is in the AUTO position the power-source switch is closed. It is also possible to displace the setting means 1 into an additional position where a nonautomatic operation of the shutter can be provided, and in fact two such positions are shown for the structure of FIG. 1, one of these being the X position and the other being the B position. In these latter positions the power-source switch 27 is open, so that when the shutter is tripped, the closing of the second of the series-connected switches in response to operation of the shutter-tripping plunger or button still will not bring about energizing of the battery because the switch 27 will remain open at this time.

In accordance with one of the features of the invention the setting means 1 also has a battery-checking position BC. The illustrated structure includes a normally open switch 21 forming part of a battery-checking circuit. In order to close this latter circuit it is necessary for the switch 21 to be closed, and a switch-actuating means 19 is provided for closing the switch 21, in a manner described in greater detail below, when the rotary setting means 1 is turned to the battery-checking position BC.

The setting means 1 includes a portion formed by an elongated arm 7, and it is this portion of the setting means which carries the switch-actuating means 19. As is apparent from FIG. 2, the rotary setting means 1 is supported for rotary movement on a pin or shaft 2. This latter shaft 2 extends centrally through the central region 1a of the setting means 1, and the shaft 2 is itself fixed to a baseplate 3. The exterior of the central part 1a of the setting means 1 is provided with suitable circular shoulders on one of which the portion 7 is freely turnable. Thus, this portion 7 is in the form of an elongated arm having a circular ring-shaped portion which is freely turnable with respect to the remainder of the setting means 1, and it is the outer end of the portion 7 which carries the switch-actuating means 19.

This portion 7 fixedly carries a pin 15 to which one end of a spring 17 is connected. The other end of the spring 17 is fixed to a stationary stop 16. This stop 16 is directly carried by the base 3 also, as is apparent from FIG. 2. In order to illustrate the structure more clearly, the baseplate 3 is omitted from FIG. 1.

Just over the portion 7 the rotary setting means 1 fixedly carries a cam 8. For this purpose a nut 10 is threaded onto the setting means 1 and fixes the cam 8 on the setting means 1 by fixing the cam 8 to a shoulder just over the portion 7, as is apparent from FIGS. 1 and 2. The cam 8 has a shoulder 8A while the freely turnable member 7 has a pin 18. Thus, the spring 17 by its action with the pins 15 and 16 and the pin 18 by its action with the shoulder 8A form an automatic means for automatically placing the setting means 1 in its position for automatic exposure determination, as illustrated in FIG. 1.

A screw 14 is threaded into a bore at the top end of the stationary shaft 2, and this screw fixed to the stationary shaft 2 an index-carrying member 13. This member is surrounded by the indicia-carrying portion 11 carrying the indicia referred to above, so that a selected one thereof can be aligned with the index of stationary member 13. The member 11 is carried by the nut 10, being fixed thereto through a screw 11 situated in a slot which enables the angular position of the indicating member 11 to be adjusted with respect to the nut 10.

Thus, as is apparent from the drawings and the description above when the operator turns the setting means 11 in a counterclockwise direction, as viewed in FIG. 1, to situate the indicium BC in alignment with the index, the spring 17 is stretched while the shoulder 8d transmits rotary movement of the setting means to the pin 18, so that the switch-actuating means 19 will be displaced to close the normally open switch 21, thus enabling battery-checking operations to take place. For convenience of operation the outer peripheral edge of the rotary setting means 1 is knurled or toothed, being provided with the teeth 9 as shown in FIGS. 1 and 2, so that the operator can readily turn the setting means 1 by finger-tip engagement with the periphery 9. FIG. 2 shows how the toothed periphery 9 of member 1 projects to the exterior of the camera through an opening in a cover thereof, for example. This cover is provided with a transparent window through which the index of member 13 and the indicia of member 11 are visible.

The operator can manually hold the setting means 1 in opposition to the force of the spring 17 in the position where the switch 21 remains closed. Once battery-checking operations are completed the operator will release the setting means 1, and now the spring 17 will act to return the portion 7 into engagement with stop 16, with the pin 18 driving the setting means 1 back to the AUTO position through engagement with the shoulder 8a of cam 8 which is fixed to the setting means 1. Thus, with the structure of the invention whenever the setting means 1 is not maintained in its battery-checking position it is displaced by the automatic means into the AUTO position.

On the other hand, the shoulder 8a and the pin 18 form a lost-motion connection between the portion 7 of the setting means and the remainder of the latter. This enables the setting means 1 to be turned in a clockwise direction, as viewed in FIG. 1, beyond the position shown in FIG. 1 to locate either the X or the B in alignment with the index when a nonautomatic exposure is to be made with a suitable flash, for example. At this time the shoulder 8a will move beyond the pin 18 while the portion 7 remains in the position to which it is moved into engagement with the stop 16 by the spring 17.

An adjustable shutter-actuating means is provided for actuating the shutter, and this adjustable means is adapted to be set at a selected position by the setting means 1. The adjustable shutter-actuating means includes a swingable lever 22 supported for pivotal movement on a suitable stationary shaft or pivot 23 fixedly carried by the base 3. A spring 24 is coiled in part around the pin or shaft 23, engages a suitable stationary pin and also extends around an edge of the lever 22 so as to urge a free end 22a thereof into engagement with the camming periphery of the cam 8. Thus, the angular position of the setting means 1 will determine the angular position of the lever 22. This lever 22 fixedly carries a pin 25 which engages and closes the normally open power switch 27 when the setting means 1 is in the position shown in FIG. 1. The parts are so designed that the switch 27 remains closed even when the setting means is placed in its battery-checking position. The exposure circuit is not closed at this time because the series-connected switch, in series with the switch 27 as pointed out above, is not closed because the shutter-actuating plunger is not actuated at this time. Therefore, it is possible for the lever 22 to remain in the position shown in FIG. 1 with the switch 27 maintained closed by the pin 25 during the time that the setting means 1 is displaced between the AUTO position and the BC position. However, when the setting means 1 is displaced to either one of the additional positions X or B, the configuration of the camming edge of the cam 8 is such that the spring 24 will turn the lever 22 in a counterclockwise direction about the pin 23, as viewed in FIG. 1, thus displacing the pin 25 away from the switch 27 and enabling the latter to automatically assume its normally open position, so that in this way when the setting means is placed in any position for nonautomatic exposure determination, the switch 27 will automatically assume its open position, thus preventing energizing of the battery when the shutter is tripped.

In order to set the shutter either for automatic or nonautomatic operation, the lever 22 has a notched free end portion 22b receiving the free end of a lever 28 connected to the shutter for placing the latter either in a position for automatic operation or in a position for nonautomatic operation.

The lower surface of member 1 which is directed toward the base 3 is formed with suitable recesses for receiving spring-pressed balls 4, as indicated schematically in FIG. 3, so that in this way a click-stop arrangement is provided for releasably holding the member 1 at a selected position. However, according to a further feature of the invention the recess which receives a spring-pressed ball when the setting means 1 is in the BC or AUTO position is an elongated recess extending around the turning axis of the rotary setting means 1 and receiving a spring-pressed ball 4 which remains in this recess during the time that the setting means 1 is displaced between and in either of its positions BC or AUTO, so that in this way there is very little resistance to movement of the setting means 1 between these positions. Thus, the spring 17 need not overcome the force of a spring pressing on a ball 4 in order to displace the setting means 1 automatically into the AUTO position when the setting means 1 is released after battery-checking as described above.

In addition, the baseplate 3 carries one or more stops 6 adapted to be engaged by one or more stops 5 fixed to and projecting from the rotary setting means 1. These stops 5 and 6 coact with each other so as to limit the turning of the rotary setting means 1 to an angular range which at one end will locate the setting means 1 in the BC position and which at the other end will locate the setting means 1 in the B position.

Thus, with the structure of the invention, before an exposure is made the operator can at any time turn the setting means 1 to the BC position in order to check the condition of the battery. Assuming that the condition of the battery is satisfactory the structure will automatically assume its AUTO position enabling exposure to take place automatically in a manner well known in the art. However, if there is an indication that the lighting conditions are not satisfactory for automatic exposure, then the operator can turn the setting means 1 to the X position, so that exposure can be made with flash.

Also, it is possible to turn the setting means 1 to the B position, so that a selected exposure time can be provided in this way.

It is apparent, therefore, that with the structure of the invention there is no requirement of a special switch at the outside of the camera to be operated manually in preparation for battery checking and in preparation for normal camera operation. Moreover, erroneous operation cannot occur with the structure of the invention because immediately upon release of setting means 1 it is automatically placed in the AUTO position. It is therefore possible with the single setting means 1 to bring about in a single operation both battery-checking and setting for automatic exposure. Thus, conventional operations requiring at least a pair of sequential operations in connection with battery-checking and shutter-setting are not required with the structure of the invention. Instead the member 1 need only be manipulated once in order to bring about battery-checking and automatic positioning for automatic exposure. Therefore, erroneous camera operation cannot occur with the structure of the invention, while such erroneous operation is readily possible with the known structures. Therefore, the structure of the invention is particularly useful with cameras having automatic exposure-determination.

It is furthermore to be noted that with the structure of the invention the switch 27 is positively released to assume its normal open position when a nonautomatic exposure takes place. Thus, whenever the light is not sufficient for automatic exposure, it is possible to make a nonautomatic exposure, and at this time the switch 27 is open, thus cutting down on the consumption of power with a needless use of power from the battery being avoided when a nonautomatic exposure is made. In this way certain economies are achieved with a longer life for the battery. Also, an extremely great convenience is achieved by automatic control of the switch 27 from the setting means 1. Furthermore, it will be noted that all of the structure for controlling the switch 27, for controlling the switch 21, and for bringing about nonautomatic shutter operation is concentrated in an extremely small space with a simple and rugged assembly of elements, so that great technical advantages are achieved by reason of these latter features also.

Thus, with a camera where it is possible to provide for nonautomatic exposure as well as an automatic exposure, after a battery-checking operation has been carried out, for example, if it is found that the available light is not adequate for the automatic exposure, the transition to nonautomatic exposure is simply brought about by manual turning of the setting means 1, with the power-source switch 27 automatically assuming its normally open position, so that all of these controls are effected in a simple fully reliable manner as through manual operation of setting means 1, without requiring any other operations to be performed.

What is claimed is:

1. In a camera, a normally open battery-checking switch forming part of a battery-checking circuit which is closed when said switch is closed, adjustable shutter-actuating means for actuating a shutter of the camera, setting means for setting said adjustable shutter-actuating means at a selected position, said setting means including at least an automatic position setting said shutter-actuating means at a position for automatically determining the exposure time, and said setting means also having a battery-checking position, switch-closing means actuated by said setting means for closing said normally open switch when said setting means is in said battery-checking position thereof, and automatic means coacting with said setting means for automatically placing the latter in said position setting said adjustable shutter-actuating means at its position for automatic exposure determination when said setting means is not maintained in said battery-checking position thereof.

2. The combination of claim 1 and wherein said automatic means includes a spring acting on said setting means for urging the latter to said position for automatic exposure determination, said setting means being manually actuated and manually held in opposition to said spring in said battery-checking position, so that upon release from the latter position said spring will automatically return said setting means to said position for automatic exposure determination.

3. The combination of claim 1 and wherein a normally open power-source switch is closed by said shutter-actuating means when the latter is placed in its position for automatic exposure determination by said setting means.

4. The combination of claim 3 and wherein said setting means coacts with said shutter-actuating means for maintaining the latter in the position for automatic exposure determination while said setting means is in said battery-checking position thereof, so that said power-source switch remains closed while said setting means is in said battery-checking position thereof.

5. The combination of claim 4 and wherein said automatic means for automatically placing said setting means in said position for automatic exposure determination includes a portion of said setting means carrying said switch-actuating means and a spring operatively connected with said portion of said setting means for acting on the latter to automatically urge said setting means to said position for automatic exposure determination.

6. The combination of claim 5 and wherein a stop engages said portion of said setting means and said spring urging said portion of said setting means into engagement with said stop for automatically placing said setting means in said position for automatic exposure determination, said setting means having at least one additional position for nonautomatic exposure, and said setting means including a lost-motion connection with said portion thereof for providing for free movement of said setting means to said additional position without transmitting movement to said portion of said setting means which remains in engagement with said stop.

7. The combination of claim 6 and wherein said setting means coacts with said adjustable shutter-actuating means for releasing power switch for movement to its normally open position when said setting means is moved to said additional position.

8. The combination of claim 6 and wherein said setting means includes a rotary member, said portion of said setting means being freely turnable into engagement with said stop and carrying a pin, said setting means having a cam provided with a shoulder engaged by said pin for turning said setting means to said position for automatic exposure determination in response to movement of said portion of said setting means into engagement with said stop by said spring, and said setting means being turnable with said cam to a position displacing said shoulder beyond said pin when said setting means moves to said additional position, said pin and shoulder forming said lost-motion connection.

9. The combination of claim 8 and wherein said cam coacts with said shutter-actuating means for placing the latter in a position releasing said power switch for movement to its normally open position when said setting means is displaced to said additional position.

10. The combination of claim 1 and wherein said setting means has at least one additional position for providing a nonautomatic exposure and said setting means having a lost-motion connection with said switch-actuating means for moving to said additional position without transmitting movement to said switch-actuating means.

* * * * *